United States Patent [19]
Swatten

[11] 4,247,747
[45] Jan. 27, 1981

[54] ILLUMINATED PANELS

[75] Inventor: Royston W. Swatten, Hanworth, England

[73] Assignee: Decca Limited, London, England

[21] Appl. No.: 18,422

[22] Filed: Mar. 7, 1979

[30] Foreign Application Priority Data

Mar. 15, 1978 [GB] United Kingdom ............. 10350/78

[51] Int. Cl.³ ...................... H01H 9/18; H01H 13/50
[52] U.S. Cl. ............................... 200/314; 200/159 B; 200/317
[58] Field of Search ........... 200/159 R, 159 A, 159 B, 200/5, 310, 314, 317; 362/23, 31

[56] References Cited
U.S. PATENT DOCUMENTS

| | | | |
|---|---|---|---|
| 2,648,305 | 8/1953 | Appleman | 200/317 |
| 2,839,670 | 6/1958 | Cladstone | 200/317 |
| 3,027,669 | 4/1962 | Hardesty | 362/23 |
| 3,321,616 | 5/1967 | Adler | 362/31 |
| 3,862,381 | 1/1975 | Glaister et al. | 200/159 B |
| 4,060,703 | 11/1971 | Everett | 200/310 |
| 4,158,115 | 6/1979 | Parkinson et al. | 200/159 B |
| 4,163,138 | 7/1979 | Harden | 200/310 |

Primary Examiner—John W. Shepperd
Attorney, Agent, or Firm—Kenyon & Kenyon

[57] ABSTRACT

A self-illuminating panel in which characters are unobtrusively illuminated by projection of light into a narrow face of a transparent flexible lamina marked with the characters. Each character, which may be a translucent printed figure, provides an optical discontinuity which disperses the light so that the diffusely illuminated character can be viewed in contrast against a dark background behind the lamina. Pressure applied on and through the flexible lamina enables operation of an array of switches disposed behind the lamina.

6 Claims, 2 Drawing Figures

ILLUMINATED PANELS

BACKGROUND OF THE INVENTION

The invention described relates to illumination of panels, in particular, but not exclusively, to press button switch-panels of which the indicators are illuminated unobtrusively whatever the intensity of the ambient light might be.

SUMMARY OF THE INVENTION

According to the invention there is provided a self-illuminating panel comprising a transparent flexible lamina, an optical source which projects light into the lamina through a narrow face thereof, the lamina bearing markings which constitute optical discontinuities that define visible characters, and an opaque screen which is behind the lamina and is spaced therefrom.

In a preferred embodiment an array of switches is disposed behind the screen, the switches being operable by the application of pressure on and through the lamina and screen.

The characters, which may be in approximate register with the locations of the switches, may be exposed by apertures in a mask disposed in front of the lamina. The characters may be translucent and printed on the obverse, or preferably the reverse of the lamina. The switches may be operable by a spring sheet disposed behind the lamina. The screen is preferably an opaque flexible sheet interposed between the lamina and the spring sheet but could be constituted by the spring sheet itself. The lamina is preferably less than 0.3 mm in thickness.

DESCRIPTION OF THE PREFERRED EMBODIMENT

Figure 1:
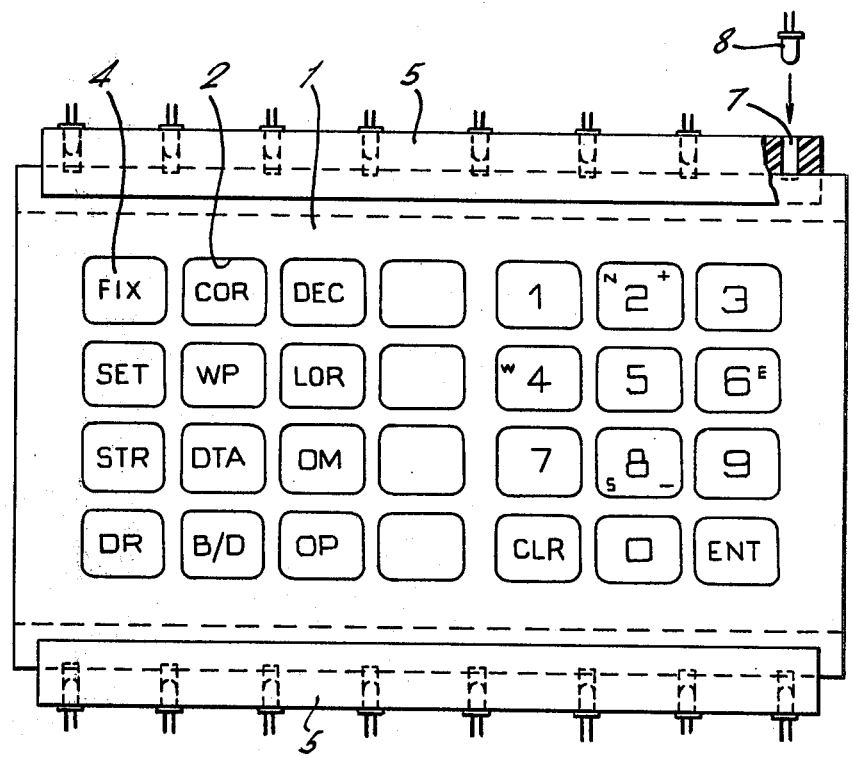
FIG. 1 illustrates a plan view of a switch panel.
Figure 2:
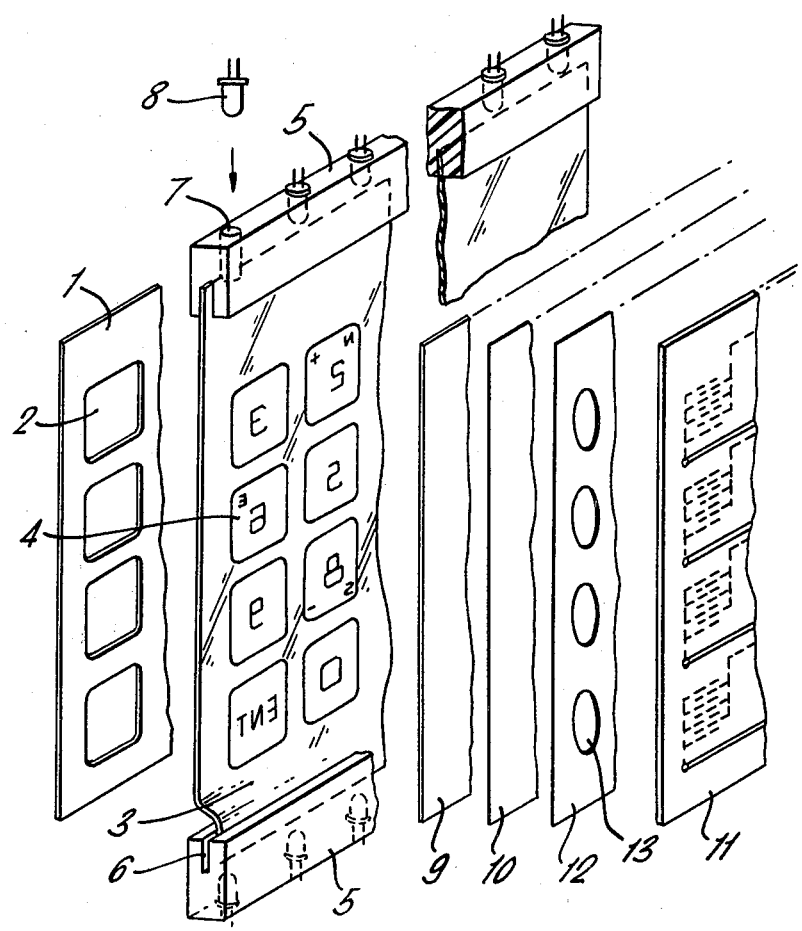
FIG. 2 is an expanded isometric view of the switch panel of FIG. 1.

Referring to FIGS. 1 and 2 an inflexible switch cover or mask 1, made of metal, plastics or other materials, has suitable openings 2, to provide switch button access, through which a transparent lamina 3 may be viewed. This cover may be hinged at one end to enable access to the surface of the film beneath and facilitate cleaning. Behind each of the openings 2 of the cover the lamina 3 is marked with symbols 4 indicating the switch to be operated. Marking of the symbols on the lamina is by silk-screen printing or other suitable method of marking which provide a translucent surface or impression on or in optical contact with the lamina. White is an effective colour for such symbols which may be marked on the back surface of the lamina for protection and so that the lamina is easier to clean. A polyester film such as "Mylar" film having a thickness of 0.007 inches is a suitable material for the transparent lamina. At one or more edges of the lamina 3 there are strips 5 made of metal, plastics or other suitable materials having a slot 6 along one edge to receive the edge of the lamina 3, and suitable mounting spaces 7 to receive illumination means such as high intensity light emitting diodes 8. Such an arrangement provides edge lighting for the lamina, the strip 5 serving the purpose of restricting the light to the required area and providing supporting means for the lamina. Red light is particularly favoured for applications where maintenance of 'night-vision' is required.

When using an illumination system comprising a number of separate light sources it is desirable that the light sources should not be located directly in line with the symbols, as this results in uneven illumination due to the symbols first in line in the light path receiving and emitting a greater intensity of light than those subsequent. A flexible screen 9 with a black surface facing lamina 3 provides a dark background against which the symbols may be viewed. There should be no contact and hence no optical contact between the sheet 9 and lamina 3, or the lamina 3 and cover 1.

An embossed spring sheet 10 is preferably located behind sheet 9 to provide a snap action for switches of which the terminals are disposed on a circuit board 11. Between spring sheet 10 and circuit board 11 a second 'Mylar' lamina 12 of, for example, 0.1 mm thickness acts as a spacer. This lamina 12 has apertures 13 through which the corresponding regions of the spring sheet 10 can contact the circuit board 11 when depressed. It will be readily apparent that a self illuminating panel according to the invention may be incorporated in a hand computer in which such an embossed spring sheet is common-place. Other forms of pressure-responsive switches could be used.

Each switch is operated by the insertion of a member, such as a finger into the aperture: the lamina, screen and sheet are sufficiently flexible to be brought together locally when a switch is operated.

I claim:
1. A self-illuminating panel comprising:
   (a) a transparent flexible lamina, said lamina bearing markings which constitute optical discontinuities that define visible characters;
   (b) an optical source which projects light into the lamina through a narrow face thereof;
   (c) an opaque flexible screen which is disposed behind the lamina and spaced therefrom; and
   (d) an array of pressure-operable switches disposed behind said screen, said switches being in register with said characters and each operable by the application of pressure on the lamina.
2. A switch panel according to claim 1 in which the lamina is less than 0.3 mm in thickness.
3. A switch panel according to claim 1 in which a mask is disposed in front of the lamina, said mask having apertures which expose the markings on the lamina.
4. A switch panel according to claim 1 further comprising a spring sheet disposed behind the screen.
5. A switch-panel according to claim 1 in which the optical source comprises a plurality of light emitters aligned on opposite narrow faces of the lamina, and each emitter projects light into the lamina at a point offset with respect to the two nearest markings on the lamina.
6. A self-illuminating panel comprising:
   (a) a transparent flexible lamina, said lamina bearing rows of markings which constitute optical discontinuities that define visible characters;
   (b) an optical source for projecting light into the lamina through a narrow face thereof, said source comprising a plurality of light emitters each offset from said rows;
   (c) an opaque flexible screen disposed behind and spaced from said lamina;
   (d) a flexible spring sheet disposed behind said screen;
   (e) an array of pressure operable switches in register with particular characters, said switches being operable by pressure applied to said lamina and through said screen and spring sheet; and
   (f) a mask disposed in front of said lamina, said mask having apertures for exposing said markings.

* * * * *